United States Patent

Dopheide

[15] 3,671,759

[45] June 20, 1972

[54] MAGNETIC SENSOR

[72] Inventor: Otto Walter Dopheide, Beaconsfield, Quebec, Canada

[73] Assignee: Northern Electric Company Limited, Montreal, Quebec, Canada

[22] Filed: Sept. 2, 1970

[21] Appl. No.: 68,924

[52] U.S. Cl. ..................307/88 R, 340/174 CT, 340/174 BC, 179/18, 336/65, 336/90, 336/196

[51] Int. Cl. ..........................................................H03k 17/82

[58] Field of Search................307/88 R; 179/18; 336/65, 84, 336/90, 92, 178, 196, 211; 340/174 CT, 174 BC

[56] References Cited

UNITED STATES PATENTS

| | | | |
|---|---|---|---|
| 3,138,720 | 6/1964 | Glore | 307/88 |
| 3,175,042 | 3/1965 | Baldwin, Jr. et al. | 179/18 |
| 3,584,823 | 6/1971 | Andrew et al. | 336/65 X |
| 3,480,896 | 11/1969 | Neuman | 336/92 X |

*Primary Examiner*—Stanley M. Urynowicz, Jr.
*Attorney*—Philip T. Erickson

[57] ABSTRACT

A ferrod sensor comprising an elongated ferrite stick having a pair of spaced apertures through which are threaded an interrogate winding and a read-out winding. Pulses or alternating current on the interrogate winding induce output pulses in the read-out winding as long as the ferrite stick is not saturated. A control winding is wound about the ferrite stick and is adapted to be energized by a pair of telephone lines, for example when the receiver is taken off the hook switch. This current causes saturation of the ferrite stick so that flux switching cannot take place and no pulses are induced in the read-out winding. The ferrite stick and its windings are placed within a ferromagnetic pot core thereby gaining higher sensitivity for the same amount of current as compared to known sensors as well as shielding from external magnetic fields. The device is very compact and a screw in one end of the pot core allows for varying the sensitivity of the device.

5 Claims, 2 Drawing Figures

INVENTOR
OTTO W. DOPHEIDE
BY Smart & Biggar
ATTORNEYS.

MAGNETIC SENSOR

BACKGROUND OF THE INVENTION

1. Field of the Invention

This invention relates to a ferromagnetic sensing device for monitoring the status of telephone lines.

2. Description of the Prior Art

A ferromagnetic sensing device for monitoring the status of telephone lines is known and is termed a ferrod sensor. Such a device can recognize and respond to the subscribers requests both for service, indicated by his lifting the telephone receiver from the switch hook, and for the termination of service, indicated by his replacing the receiver on the switch hook. These actions respectively close and open a conductive path to the central office battery supply. The ferrod sensor replaced prior arrangements wherein the presence of line current actuated a relay which was released during the no-current, on-hook condition. Under the conditions of inductive interference and leakage, normally encountered on long lines it becomes necessary to distinguish between current magnitudes which are either above or below particular threshold values established on the basis of both system operating limitations and experience. While sensitive relays for such work provide fair resolution and immunity from interference, they employ delicate and expensive moving parts, are slow in operation and are not readily adaptable for use in compact, high-speed scanning supervisory arrays.

The ferrod sensor has no moving parts and its output is isolated from the telephone lines. The basis ferrod sensor is fully disclosed in Canadian Pat. No. 702,546 of John A. Baldwin, Jr. et al. issued Jan. 26, 1965. Essentially, it comprises, in one embodiment, an elongated ferrite stick having a pair of spaced apertures through which are threaded an interrogate winding and a read-out winding. Pulses or alternating current on the interrogate winding induce output pulses in the read-out winding as long as the ferrite stick is not saturated. A control winding is wound about the ferrite stick and is adapted to be energized by a pair of telephone lines, for example when the receiver is taken off the hook switch. This current causes saturation of the ferrite stick so that flux switching cannot take place and no pulses are induced in the read-out winding.

An improvement on the basic device is disclosed in U.S. Pat. No. 3,138,720 of R.F. Glore issued June 23, 1964. The ferromagnetic sensing device disclosed by Glore is capable of adjustment as regards its sensitivity by inserting insulators of different dimensions in its flux return path. It is, however, difficult to change insulators so that once the design is finalized in terms of the insulator, it is in effect non-adjustable.

SUMMARY OF THE INVENTION

The sensor according to the invention is smaller than the Glore device due to using a continuous magnetic path that has only one air gap which is adjustable by means of a movable ferromagnetic element, e.g. a steel screw. Therefore, the magnetic path has a low reluctance. In contrast to this, Glore's device has a coil which is geometrically far removed from the stick itself and its only means of coupling is a very large air space between the coil itself and the stick into which is supposed to induce magnetic flux. In the device disclosed herein, adjustment is stepless and capable of compensating for normal manufacturing tolerances. For this reason, and due to the low reluctance path of the device, quality levels of performance are improved.

In the device disclosed herein, the ferrite stick and its windings are placed within a ferromagnetic pot core thereby gaining a considerably higher sensitivity than with the Glore device with the same amount of current. The control winding is contained in and shielded by the ferrite core and is thus not subject to external magnetic fields. In other words, the sensitivity of the operating coils of the device are not disturbed by the earth's magnetic field, or other stray magnetic fields. The use of a complete enclosure as provided by the pot core permits the use of a very small ferrite stick. The overall reluctance of the device is small so that energization of it need be only much, much smaller, a fraction of what Glore's device needs in order to do the same thing.

To sum up, the present device is smaller and cheaper than the Glore device, is readily adjustable and is not influenced by stray magnetic fields.

The ferromagnetic sensing device according to the invention comprises two ferrite half-cup cores, each having an end wall, an outer annular wall and an inner annular wall. The inner annular wall is shorter than the outer annular wall and the half-cups are joined end-to-end by their outer annular walls with their end walls facing outwards. An elongated ferrite element is disposed within the half-cup cores with its ends enclosed by the inner annular walls. The ferrite element has two apertures through which are threaded an interrogate winding and a read-out winding. A control winding adapted for connection across a pair of telephone lines is disposed within a space defined by the end walls and the outer and inner annular walls and encircles the inner annular walls and the ferrite element.

A cylindrical piece of ferromagnetic material may be disposed within the inner annular wall of one of the half-cup cores with the piece of material having a slot into which fits an end of the elongated ferrite element.

A cylindrical piece of ferromagnetic material, e.g. a steel screw, may be adjustably mounted within the inner annular wall of one of the half-cup cores for movement towards or away from an end of the elongated ferrite element. The half-cup cores form a magnetic flux return path for flux produced in the ferrite element by the control winding and the flux return path has a reluctance which can be varied by movement of the cylindrical piece of ferromagnetic material.

DESCRIPTION OF THE PREFERRED EMBODIMENT

Figure 1:
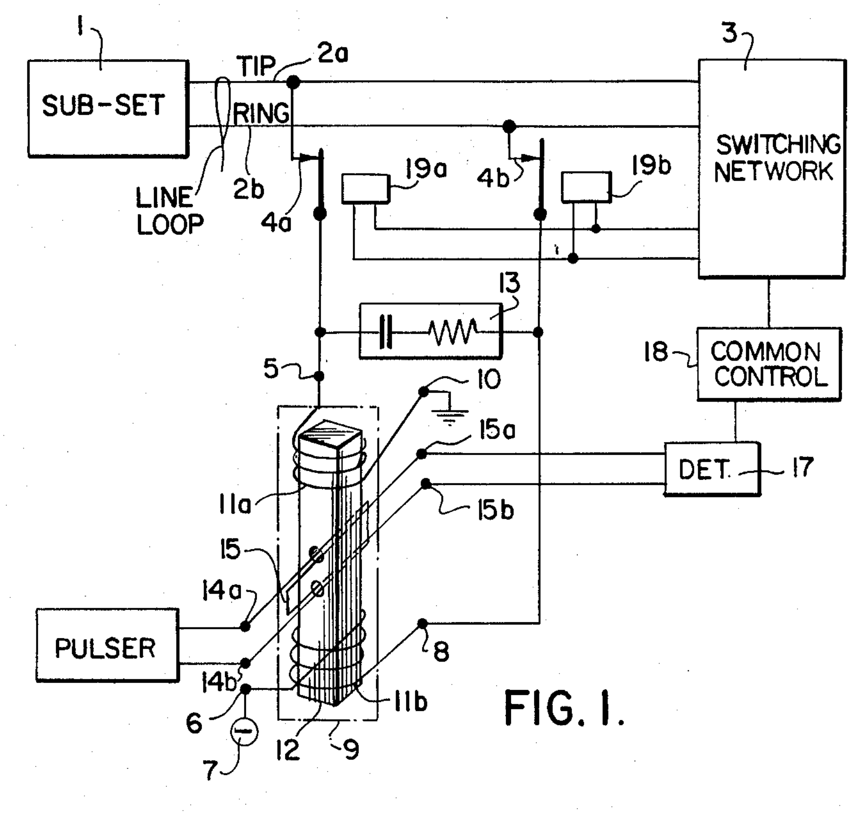
FIG. 1 is a partly block, partly schematic diagram of a prior art device.

FIG. 1 is reproduced from the above mentioned Glore patent and illustrates a typical use of a ferromagnetic sensing device to determine the status of a telephone line. Sub-set 1 is connected by transmission lines **2*a* and 2*b* to the switching network 3. Each side of the transmission line is also connected through one of the normally closed contacts 4*a* and 4*b* to terminal points 5 and 8 of ferrod (ferromagnetic sensing device) 9. Lifting the hand set from sub-set 1 will allow the switch hook of sub-set 1 to establish continuity between points 5 and 8 through normally closed contacts 4*a* and 4*b* and transmission lines 2*a* and 2*b* so that current will flow from point 10, which is connected to ground potential, through energizing coils (control windings) 11*a* and 11*b* to point 6 which is connected to minus potential source 7. Energizing coils 11*a* and 11*b* are mounted coaxially with ferromagnetic element 12. Sufficient current in these energizing coils will saturate ferromagnetic element 12 and inhibit the pulses from pulser 16, which is connected to drive loop (interrogate winding) 14, from coupling through a read-out winding 15, which is connected to detector 17. Hence, if the hand-set of sub-set 1 is in the "on-hook" condition, the current is not present in the energizing coils 11*a* and 11*b*** and the pulses will not be inhibited from passing to the detector; whereas, the "off-hook" condition, which is brought about by the subscriber lifting the hand set, will be recognized by a no pulse condition at the detector.

An indication by detector 17 via common control 18 to switching network 3 that the subscriber desires service will cause switching network 3 to supply dial tone over transmission lines **2*a* and 2*b* and to activate coils 19*a* and 19*b* of normally closed contacts 4*a* and 4*b*; as a result of said coil activation, ferrod 9 is disconnected from transmission lines 2*a*** and 2*b*. The interruption of the energizing current which occurs when contacts 4*a* and 4*b* open would normally cause damage to these contacts as a result of arc-over caused by the inductive effect of energizing coils 11*a* and 11*b* on the current. In order to reduce this arc-over, protection network 13 is connected between terminal points 5 and 8 of ferrod 9.

Figure 2:
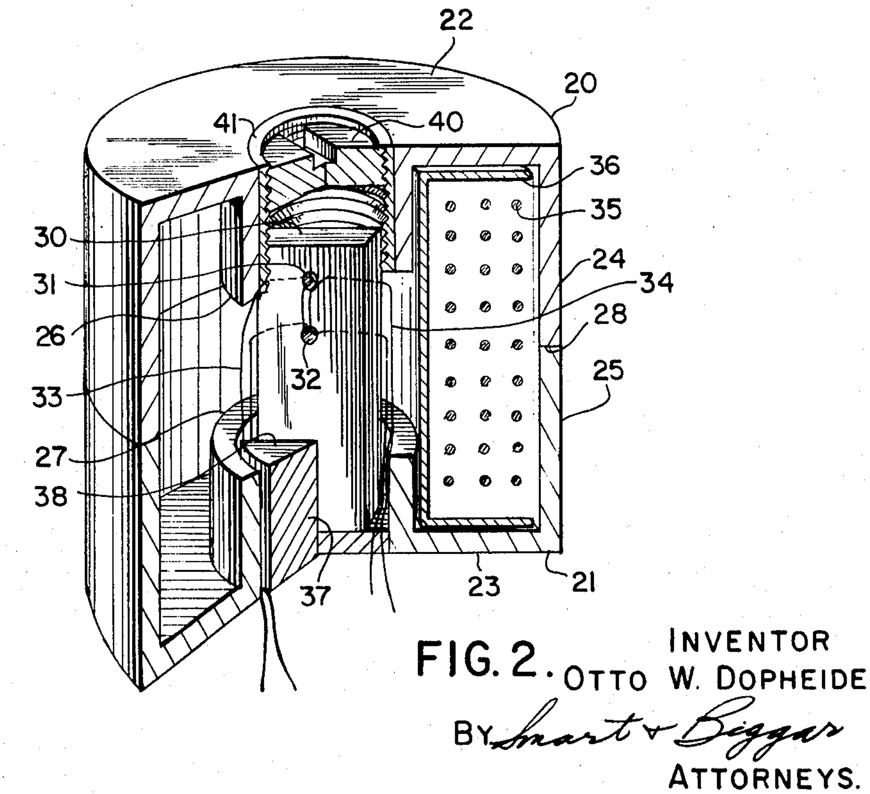
FIG. 2 is a cut-away view of the ferromagnetic sensing device according to the invention.

FIG. 2 shows the improvement according to the present invention and is seen to comprise two ferrite half-cup cores 20 and 21 each having an end wall 22 and 23, respectively, outer annular walls 24 and 15, respectively and inner annular walls 26 and 27, respectively. The inner annular walls 26 and 27 are shorter than the outer annular walls 24 and 25 and the half-cup cores 20 and 21 are joined end-to-end at 28 by their outer annular walls with the end walls 22 and 23 facing outwards. An elongated ferrite element 30 is disposed within the half-cup cores with its ends enclosed by the inner annular walls 26 and 27. The ferrite element 30 has two apertures 31 and 32 through which are threaded an interrogate winding 33 and a read-out winding 34. A control winding 35, adapted for connection across a pair of telephone lines, is disposed within a space defined by the end walls 22 and 23 and the outer and inner annular walls of the two half-cup cores, the control winding encircling the inner annular walls 26 and 27 and the ferrite element 30. The winding 35 may be wound on a suitable former 36 for ease of assembly. For example, the coil 35 can simply be set in one of the half-cup cores and the other half-cup core placed on the other end.

A cylindrical piece of ferromagnetic material, e.g. an iron "-plug", may be disposed within the inner annular wall of one of the half-cup cores, e.g. core 21, this piece of material being designated by reference numeral 37. The piece of material 37 is provided with a slot, one edge of which is designated by reference numeral 38 and one end of the elongated piece of ferromagnetic material fits into this slot.

The other half-cup core, half-cup core 20 in FIG. 2, may be provided with a cylindrical piece of ferromagnetic material 40 adjustably mounted within the inner annular wall of half-cup core 20 for movement towards or away from an end of the elongated ferrite element 30. Specifically, item 40 may comprise a steel screw having external screw threads which mate with internal screw threads on a steel insert 41 contained with the inner annular wall 26 of half-cup core 20. Possibly screw threads could be formed on the inner annular wall 26 but, as this is formed of ferrite material, this would be difficult and hence it is preferable to use a metal insert such as steel or iron or an alloy having suitable magnetic properties.

The half-cup cores 20 and 21 form a magnetic flux return path for flux produced in the ferrite element by the control winding 35 and this flux return path has a reluctance which can be varied by movement of screw 40. Very fine adjustment is possible by this means.

The ends of the control winding 35 may be taken out through any suitable opening and the same applies to the interrogate and read-out windings which latter two are shown as coming out through insert 38.

WHAT I CLAIM AS MY INVENTION IS:

1. A ferromagnetic sensing device for monitoring the status of telephone lines comprising two ferrite half-cup cores, each having an end wall, an outer annular wall and an inner annular wall, the inner annular wall being shorter than the outer annular wall, said half-cups being joined end-to-end by their outer annular walls with their end walls facing outwards, an elongated ferrite element being disposed within said half-cup cores with its ends enclosed by said inner annular walls, said ferrite element having two apertures through which are threaded an interrogate winding and a read-out winding, a control winding adapted for connection across a pair of telephone lines being disposed within a space defined by the end walls and the outer and inner annular walls and encircling said inner annular walls and said ferrite element.

2. A device as claimed in claim 1 wherein a cylindrical piece of ferromagnetic material is disposed within the inner annular wall of one of said half-cup cores and said piece of material has a slot into which its an end of said elongated ferrite element.

3. A device as claimed in claim 1 wherein a cylindrical piece of ferromagnetic material is adjustably mounted within the inner annular wall of one of said half-cup cores for movement towards or away from an end of said elongated ferrite element, said half-cup cores forming a magnetic flux return path for flux produced in said ferrite element by said control winding and said flux return path having a reluctance which can be varied by movement of said cylindrical piece of ferromagnetic material.

4. A device as claimed in claim 3 wherein said cylindrical piece of ferromagnetic material has external screw threads engageable with internal screw threads on an annular ferromagnetic insert secured to the inner annular wall of said one of said half-cup cores.

5. A device as claimed in claim 3 wherein said cylindrical piece of ferromagnetic material has external screw threads engageable with internal screw threads on the inner annular wall of said one of said half-cup cores.

* * * * *